(12) United States Patent
Hirano et al.

(10) Patent No.: US 12,391,771 B2
(45) Date of Patent: Aug. 19, 2025

(54) METHOD FOR MANUFACTURING SWELLING-INHIBITED STARCH

(71) Applicant: NIHON SHOKUHIN KAKO CO., LTD., Tokyo (JP)

(72) Inventors: Misa Hirano, Fuji (JP); Kazuki Morimoto, Fuji (JP); Yohei Takagi, Fuji (JP); Hitoshi Takaguchi, Fuji (JP)

(73) Assignee: NIHON SHOKUHIN KAKO CO., LTD., Tokyo (JP)

( * ) Notice: Subject to any disclaimer, the term of this patent is extended or adjusted under 35 U.S.C. 154(b) by 381 days.

(21) Appl. No.: 17/777,814

(22) PCT Filed: Oct. 26, 2020

(86) PCT No.: PCT/JP2020/040127
§ 371 (c)(1),
(2) Date: May 18, 2022

(87) PCT Pub. No.: WO2021/100410
PCT Pub. Date: May 27, 2021

(65) Prior Publication Data
US 2022/0411539 A1 Dec. 29, 2022

(30) Foreign Application Priority Data

Nov. 19, 2019 (JP) ................................. 2019-208713

(51) Int. Cl.
*C08B 30/06* (2006.01)
*A23L 23/00* (2016.01)
*A23L 29/212* (2016.01)

(52) U.S. Cl.
CPC .............. *C08B 30/06* (2013.01); *A23L 23/00* (2016.08); *A23L 29/212* (2016.08); *A23V 2002/00* (2013.01)

(58) Field of Classification Search
CPC ........ C08B 30/06; A23L 29/212; A23L 23/00; A23V 2002/00
USPC ........................................................ 426/589
See application file for complete search history.

(56) References Cited

U.S. PATENT DOCUMENTS

| | | | |
|---|---|---|---|
| 3,977,897 A | 8/1976 | Wurzburg et al. | |
| 4,013,799 A | 3/1977 | Smalligan et al. | |
| 2016/0376381 A1 | 12/2016 | Shah | |
| 2021/0403605 A1* | 12/2021 | Ghotra | .................... C08B 30/12 |
| 2022/0174997 A1 | 6/2022 | Imaizumi et al. | |

FOREIGN PATENT DOCUMENTS

| | | |
|---|---|---|
| EP | 3287010 A1 | 2/2018 |
| EP | 3 949 755 A1 | 2/2022 |
| JP | 52-038037 A | 3/1977 |
| JP | 07-070206 A | 3/1995 |
| JP | 09-503549 A | 4/1997 |
| JP | 10-195105 A | 7/1998 |
| JP | 11-332480 A | 12/1999 |
| JP | 2002142700 A | 5/2002 |
| JP | 2003325119 A | 11/2003 |
| JP | 2004-009022 A | 1/2004 |
| JP | 2005-054028 A | 3/2005 |
| JP | 2005-171112 A | 6/2005 |
| JP | 2009-296961 A | 12/2009 |
| JP | 2011-229515 A | 11/2011 |
| JP | 2016-067336 A | 5/2016 |
| WO | 96/04315 A1 | 2/1996 |
| WO | 2016/052712 A1 | 4/2016 |

OTHER PUBLICATIONS

Malumba Paul et al., "Comparative study of the effect of drying temperatures and heat-moisture treatment on the physicochemical and functional properties of corn starch", Carbohydrate Polymers, 2010, pp. 633-641, vol. 79.
Takashi Kuge et al., "Annealing of Starch Granules- Warm Water Treatment and Heat-Moisture Treatment", J.Jpn. Soc.Starch Sci., 1985, pp. 65-83, vol. 32, No. 1.
International Search Report of PCT/JP2020/040127 dated Dec. 28, 2020 [PCT/ISA/210].
Written Opinion of PCT/JP2020/040127 dated Dec. 28, 2020 [PCT/ISA/237].
Written Opinion of JP2019-208713 dated Mar. 23, 2020.
Notice of Dispatch of Duplicates of a Written Opposition of JP2019-208713 dated Jul. 9, 2021.
Written Opposition of JP2019-208713 dated Jun. 2, 2021.
Written Opposition of JP2019-208713 dated Jun. 9, 2021.
Extended European Search Report dated Nov. 23, 2023 in European Application No. 20888794.3.
International Preliminary Report on Patentability with Translation of the Written Opinion issued May 17, 2022 in International Application No. PCT/JP2020/040127.

(Continued)

*Primary Examiner* — Brent T O'Hern
(74) *Attorney, Agent, or Firm* — Sughrue Mion, PLLC

(57) ABSTRACT

A method for manufacturing a swelling-inhibited starch, the production method including a step for performing a heating treatment at 55-205° C. on a starch for which the value of $M_1-M_0$ is within the range from −10 to 20 and setting a breakdown value of a starch paste solution to no greater than 75% of the value before the heating treatment. The heating treatment is performed using closed heating equipment without implementing a moist-heat treatment.

$M_1$: Moisture content (%) of starch before heating treatment $M_0$: Equilibrium moisture content (%) of starch at normal temperature and normal humidity.

7 Claims, No Drawings

(56) References Cited

OTHER PUBLICATIONS

Takahiro Yagishita et al., "Physicochemical Properties of Monosodium Glutamate-Compounded Tapioca Starch Exceeds Those of Simple Heat-Moisture Treated Starch", Journal of Food Science, 2011, vol. 76, No. 7, pp. C980-C984 (5 pages total).

* cited by examiner

007F
METHOD FOR MANUFACTURING SWELLING-INHIBITED STARCH

CROSS REFERENCE TO RELATED APPLICATIONS

This application is a National Stage of International Application No. PCT/JP2020/040127 filed on Oct. 26, 2020, claiming priority based on Japanese Patent Application No. 2019-208713 filed on Nov. 19, 2019.

TECHNICAL FIELD

The present invention relates to a method for manufacturing a starch in which a swelling-inhibiting treatment is physically implemented. More specifically, the present invention relates to a method for heat-treating a starch in which the moisture content has been adjusted, thereby implementing a swelling-inhibiting treatment and improving the physical properties of the starch.

BACKGROUND ART

Starch is a major raw material that is used in the food industry in order to achieve excellent thickening and gelling characteristics. However, there have been cases where process durability in food manufacturing is deficient, and where it is impossible to impart desired characteristics such as solubility, viscosity, texture, and transparency; therefore, unprocessed starch cannot be used as a lone improvement agent in a wide range of fields. For example, in food processing, heat, acidity, and shear stress loads destroy starch granules and cause the starch to be dissolved/dispersed in the food, and there is a tendency for unintended thickening or gelling to occur. Therefore, unprocessed starches generally are not suitable for use in processed foods.

In order to overcome these drawbacks, unprocessed starches are often modified using a discretionary variety of modification techniques, i.e., chemical, physical, and/or enzymatic modification. Among these, treatments for inhibiting swelling in unprocessed starches are effective in preventing the starch granules from being destroyed. As a swelling-inhibiting treatment used in starches for foods, there is known a procedure for implementing chemical modification on an unprocessed starch and introducing a cross-linking structure, and cross-linked starches into which adipic-acid cross-linking or phosphoric-acid cross-linking has been introduced are widely used, especially in the field of foods (Non-Patent Document 1). However, this cross-linking treatment involves using a variety of chemicals, and therefore presents problems in terms of manufacturing costs and impact on the environment.

Aside from the above, a method for heat-treating a mixture of a starch and a polysaccharide thickener (Patent Document 1) and a method for incorporating an organic acid salt into a starch and then heat-treating the resultant mixture (Patent Document 2) are known as swelling-inhibiting treatments in which no chemicals are used, but both of these methods have issues in that food additives or chemical substances used as auxiliary raw materials remain.

Additionally, due to the effect of the increase in consumers' awareness of food safety in recent years, there is an increasing need for food ingredients that are more natural. In view of this background, there has been increasing demand for starches that exhibit the same effects as cross-linked starches without the use of chemicals or food additives.

For example, Patent Document 3 proposes a method for manufacturing a swelling-inhibited starch using only water and an unprocessed starch, the method involving heating the starch at high temperature and high pressure at a given moisture content to perform a moist-heat treatment, and Patent Document 4 proposes a method in which a starch is heat-treated after having been substantially configured in an anhydrous state.

However, these methods present problems in that: moist-heat-treated starches are prone to damage, and workability decreases upon the starches becoming viscous or upon accretions being produced when the starches are used as thickeners; and a texture having a poor melt-in-the-mouth sensation is produced. The methods also have issues in that dedicated equipment for treating starches under moist-heat conditions is necessary. Furthermore, in methods in which a starch is heat-treated after having been substantially configured in an anhydrous state, it may be impossible to sufficiently inhibit swelling of the starch, depending on the machine equipment used.

PRIOR ART DOCUMENTS

Non-Patent Documents

[Non-Patent Document 1] Encyclopedia of starch science (Denpun kagaku no jiten), published by Asakura Shoten Co., Ltd., March 2003, p. 403

Patent Documents

[Patent Document 1] Japanese Laid-open Patent Application No. 2005-054028
[Patent Document 2] Japanese Laid-open Patent Application No. 2005-171112
[Patent Document 3] Japanese Laid-open Patent Application No. 10-195105
[Patent Document 4] Domestic Republication No. 09-503549

DISCLOSURE OF THE INVENTION

Problems the Invention is Intended to Solve

It is an object of the present invention to establish a novel manufacturing method in which auxiliary materials such as cross-linking agents and water-repellent agents are unnecessary and in which the characteristics of a starch paste solution are significantly changed using only water and a starch.

Means for Solving the Aforementioned Problems

The inventors discovered that performing a prescribed heating treatment on a starch for which the moisture content is within a prescribed range makes it possible to efficiently implement a swelling-inhibiting treatment on the starch and to improve the characteristics of a starch paste solution.

Accordingly, the method for manufacturing a swelling-inhibited starch of the present invention is characterized by including a step for performing a heating treatment at 55–205° C. on a starch for which the value of $M_1-M_0$ is within the range from −10 to 20 and setting a breakdown value of a starch paste solution to no greater than 75% of the value before the heating treatment.

$M_1$: Moisture content (%) of starch before heating treatment
$M_0$: Equilibrium moisture content (%) of starch at normal temperature and normal humidity In the present invention, there is preferably included a step for adjusting the value of $M_1-M_0$ to within the range from −10 to 20.

In the present invention, a raw-material starch is preferably an unprocessed starch.

In the present invention, the raw-material starch is preferably an unprocessed tuber-based starch.

In the present invention, the heating treatment is preferably performed using closed heating equipment.

In the present invention, a swelling-inhibited starch is manufactured using the method described above, whereupon the resultant swelling-inhibited starch is preferably blended as a raw material to manufacture a food or beverage.

In the present invention, the food or beverage is preferably at least one selected from soups/sauces, processed seafood, processed meat products and fried foods.

Effect of the Invention

According to the present invention, swelling of a starch can be inhibited through a very simple procedure that involves heating under fixed moisture content and temperature conditions, wherefore it is possible to obtain a starch that has less impact on the environment than is the case with typical cross-linking treatments in which a variety of chemicals are used, that is easily and inexpensively subjected to a swelling-inhibiting treatment, and that does not raise any concerns as to safety as a food. It is also possible to implement the swelling-inhibiting treatment on the starch with a comparatively high degree of freedom in terms of equipment design. It is additionally possible to blend this starch as a raw material to thereby obtain a food or beverage that exhibits suitable spreading and viscoelasticity and that furthermore has an excellent consistency with little sliminess.

BEST MODE FOR CARRYING OUT THE INVENTION

In the present invention, there is used a starch for which the value obtained by subtracting $M_0$ (equilibrium moisture content (%) of the starch at normal temperature and normal humidity) from $M_1$ (moisture content (%) of the starch before heating treatment) is adjusted to within the range from −10 to 20. By "normal temperature and normal humidity" is meant a temperature of 23° C. and a humidity of 50% RH.

The value of $M_0$ varies depending on, inter alia, the source crop for the starch being used, and can be measured using the procedure described below.

<Method for Measuring $M_0$>

The moisture content of a starch that has been sufficiently brought to equilibrium by being allowed to stand for at least one week at normal temperature and normal humidity is measured using a rapid moisture meter at 130° C. for 20 minutes. For example, model MT-C made by Brabender can be used as the rapid moisture meter.

When measurements are conducted using the method described above, the value of $M_0$ is, e.g., about 13% in the case of tapioca, about 17% in the case of potato starch, about 12% in the case of corn starch, and about 13% in the case of pea starch.

The value of $M_1$ can be measured under the conditions described below. When a prescribed amount of water is added to a starch that has been sufficiently brought to equilibrium at normal temperature and normal humidity, the value of $M_1$ can be calculated from the value of $M_0$ and the amount of moisture added.

<Method for Measuring $M_1$>

A starch that has been adjusted to a prescribed moisture content through addition of water, or through drying using a dryer, is supplied to the rapid moisture meter, and the moisture content of the starch is measured at 130° C. for 20 minutes.

The starch used in the present invention is such that the value of $M_1-M_0$ is within the range from −10 to 20 as described above, and the value of $M_1$ is preferably adjusted, as appropriate, in accordance with the value of $M_0$. For example, a starch for which the value of $M_1$ is 3-37 can be used. When a commercially available starch satisfies the requirements described above, the commercially available product can be used without modification. However, if the commercially available starch does not satisfy the requirements described above, the value of $M_1-M_0$, or more specifically the value of $M_1$, can be adjusted so as to fall within the range described above by adding water to or drying the commercially available product, as appropriate.

In the present invention, the starch is next heat-treated at 55-205° C., and the breakdown value of a starch paste solution is set to no greater than 75% of the value before the heating treatment.

In the present invention, by "breakdown value of a starch paste solution" is specifically meant a decrease in viscosity (difference between highest viscosity and lowest viscosity) that occurs due to starch particles collapsing after the starch has swelled and the highest viscosity has been exhibited. The breakdown value is measured in the present invention using the following procedure.

Specifically, the viscosity of the starch paste solution is measured as follows using a paste viscosity measurement device (e.g., a Rapid Visco Analyzer (RVA) made by Newport Scientific, model RVA-4). More specifically, a sample starch measured to be 1.8 g in terms of solid content is introduced into an aluminum canister, and purified water is added to reach a total mass of 30 g (6 mass %), after which a paddle is positioned and the viscosity is measured under the conditions shown in Table 1.

Breakdown value=highest viscosity−lowest viscosity

TABLE 1

| | Measurement time (min:sec) | | | | | | | | | | |
|---|---|---|---|---|---|---|---|---|---|---|---|
| | 0:00 (start) | 0:10 | 1:00 | ~ | 4:42 | ~ | 7:12 | ~ | 11:00 | ~ | 13:00 (end) |
| Temp. (° C.) | 50 | 50 | 59 | Heating | 95 | 95 | 95 | Cooling | 50 | 50 | 50 |
| Paddle rotation speed (rpm) | 960 | 160 | 160 | 160 | 160 | 160 | 160 | 160 | 160 | 160 | 160 |

There are cases in the present invention where the breakdown value of the starch after heating treatment is expressed as a "breakdown change rate (%)," where the breakdown value of the starch before heating treatment is designated as 100. The aforementioned value indicates the extent to which swelling of the starch is inhibited. A lower value equates to a better evaluation of the extent to which swelling is inhibited.

In the present invention, the heating treatment is implemented such that the breakdown value of a starch paste solution when a starch having a moisture content within a specified range is treated at a temperature within a specified range is no greater than 75% of the value before the treatment (i.e., the breakdown change rate is 75% or less). There is no particular limitation as to the heating conditions.

As shall be apparent from the examples described later, the starch will break down and the extent of damage will increase when the heating temperature is too high; it is undesirable for the heating temperature to exceed 205° C. because the starch will break down, resulting in browning or a roasted odor. Conversely, when the heating temperature is too low, the consistency of the starch does not change and the swelling-inhibiting treatment cannot be implemented. The swelling-inhibiting treatment becomes easier to implement as the heating temperature increases, and as the heating time increases.

In cases where the temperature is the same, it becomes more difficult to implement the swelling-inhibiting treatment as the value of $M_1-M_0$ decreases (as the moisture content of the starch before heating treatment decreases), and it becomes easier to implement the swelling-inhibiting treatment as the value of $M_1-M_0$ increases (as the moisture content of the starch before heating treatment increases). However, if the value of $M_1-M_0$ becomes too high, then the extent of starch damage will increase, and a spreading-related consistency or a sticky mouthfeel approximating that of a paste will result, therefore making it more difficult to obtain the desired quality in a food or beverage.

Specifically, if the value of $M_1-M_0$ is less than −10, then the swelling-inhibiting treatment will not sufficiently advance, the rate of change in the breakdown value will exceed 75%, and the undesired quality described above will be obtained. Moreover, if the value of $M_1-M_0$ is greater than 20, then despite the swelling-inhibiting treatment sufficiently advancing, the extent of starch damage will exceed 5%, and the undesired quality described above will be obtained. The heating time can be adjusted in a discretionary manner, in accordance with the heating temperature, the moisture content, and equipment specifications, so that the target quality is obtained.

As indicated in the examples described later, even when a method for heat-treating a starch after having substantially configured the starch in an anhydrous state (with a moisture content of less than 1%) is carried out as disclosed in Domestic Republication No. 09-503549, the value of $M_1-M_0$ falls below −10 and a sufficient swelling-inhibiting effect could not be obtained. It is thought that this result originates from peculiarities of the heating apparatus used in Domestic Republication No. 09-503549 (the type or shape of the apparatus, the fluid gas, etc.). Accordingly, the present invention provides a method for manufacturing a swelling-inhibited starch, the method differing from manufacturing methods that have a step for drying a starch until a substantially anhydrous state is achieved (with a moisture content of less than 1%) and a step for subsequently implementing a heating treatment, and the method moreover involving obtaining a swelling-inhibited starch in a simpler manner and with a greater degree of freedom in terms of equipment design.

The present invention also differs from moist-heat-treated starches obtained by implementing a "moist-heat treatment" for introducing water vapor and heating a starch under water vapor saturation. It is known that the crystalline structure of a starch typically dramatically changes and the physical and functional characteristics of the starch also change as a result of moist-heat treatment. However, it has been confirmed through X-ray diffraction that the crystalline structure of the swelling-inhibited starch of the present invention does not change from that of the raw-material starch. Whereas it is necessary to heat a starch under water vapor saturation and to provide specialized equipment in order to obtain a moist-heat-treated starch, the present invention provides a method for obtaining a swelling-inhibited starch in a simpler manner and with a greater degree of freedom in terms of equipment design.

There is no particular limitation as to the heating equipment used in the present invention, provided that the heating equipment can perform a heating treatment such that a starch having the desired consistency is obtained. It is possible to use a superheated steam dryer, shelf-type dryer, band dryer, kneader, extruder, stirring dryer, etc. However, the extent to which swelling of the starch is suppressed varies depending on the equipment used in the heating treatment. For example, when heating equipment such as a superheated steam dryer or air-blasting dryer (shelf-type dryer, band dryer, etc.) is used, because gas is the main heat medium, the starch particles will tend to readily reach a dry state before being heated and the swelling-inhibiting treatment is moderate. However, when closed heating equipment such as a kneader, extruder, or stirring dryer is used, the starch is heated before the moisture evaporates, and therefore the swelling-inhibiting treatment reaches a comparatively high level.

According to the features described above, it is preferable to use closed heating equipment in the present invention in consideration of the efficiency of the swelling-inhibiting treatment. As described later, in the manufacturing method of the present invention, it is important to implement the heating treatment under fixed moisture content conditions. Therefore, flash dryers and other equipment in which moisture instantly evaporates and the starch dries is undesirable due to the possibility that starch having satisfactory performance will not be obtained.

As described above, in the method for manufacturing a swelling-inhibited starch of the present invention, there is no limitation as to the method for heat-treating the starch, provided that starch having the desired consistency is obtained. In this method, it is possible to determine the heating treatment conditions by adjusting the heating temperature, the heating time, the value of $M_1-M_0$, the heating equipment, etc., as appropriate. In detail, these parameters can be determined, as appropriate, based on the disclosures above and data in the examples described later.

There is no particular limitation as to the raw-material starch used in the manufacturing method of the present invention, provided that the raw-material starch is industrially applicable. In consideration of the gist of the present invention, which is to implement the swelling-inhibiting treatment on a starch using a procedure that is easy and inexpensive, that has little impact on the environment, and that does not raise any concerns as to safety, it is preferable to use an unprocessed starch (a raw starch that has not been chemically or physically processed). Additionally, in view of this gist, it is preferable not to use any material other than the raw-material starch and water in the manufacturing method of the present invention.

There is no particular limitation as to the source of the raw-material starch used in the present invention; examples include corn starch, tapioca, rice starch, wheat starch, potato starch, sweet potato starch, mung bean starch, dogtooth violet starch, kudzu starch, bracken starch, sago starch, and pea starch, and it is possible to use, inter alia, non-glutinous, waxy, or high-amylose variants of any of these starches. It is understood that the swelling-inhibiting treatment of the present invention advances particularly more readily with tuber-based starches (starches derived from tubers, corms, or tuberous roots), such as tapioca or potato starch, than with grain-based starches such as corn starch, which was unexpected. This is thought to be due to differences in the crystalline structure of the starch granules. Thus, unprocessed tuber-based starches are preferred, and unprocessed tapioca is particularly preferred from the standpoint of easy of procurement. There is no particular limitation as to the pH of the starch; however, it is preferable to use a starch having a pH (of a 10% w/w starch slurry) of 4.5-10 in consideration of the possibility that the starch will break down (decrease in molecular weight) during the heating treatment.

In the present invention, the heating treatment conditions can be set, as appropriate, in accordance with the type of raw-material starch being used, the value of $M_1-M_0$, the heating equipment, etc., provided that the breakdown value of the starch paste solution subjected to the heating treatment is set so as to be no greater than 75% of the value before the heating treatment. For example, the heating temperature is preferably 60-200° C., and more preferably 70-180° C. If the heating temperature is too low, then the swelling-inhibiting effect will be weak; conversely, if the heating temperature is too high, then the extent of starch damage will tend to increase. The heating time can be shortened as the heating temperature increases, and can be lengthened as the heating temperature decreases, to adjust the heating time as appropriate. When the heating temperature is within a range from at least 60° C. to less than 100° C., the heating time is preferably set to 0.2-48 hours; when the heating temperature is within the range of 100-200° C., the heating time is preferably set to 0.1-24 hours. For example, when a tuber-based starch is used as the raw-material starch and a closed heating device is used as the heating equipment, it is preferable to employ a heating time of 0.1-24 hours at a heating temperature of 60-200° C., and more preferable to employ a heating time of 0.2-18 hours at a heating temperature of 70-180° C.

The extent of starch damage for the swelling-inhibited starch in the present invention is preferably 5% or less, and more preferably 3% or less. If the extent of starch damage is high, then a spreading-related consistency or a sticky mouthfeel approximating that of a paste will result, as described above, therefore making it more difficult to obtain the desired quality in a food or beverage. The extent of starch damage can be adjusted by the value of $M_1-M_0$, or by the heating temperature and the heating time.

The present invention also relates to a method for manufacturing a food or beverage, the method involving blending the swelling-inhibited starch manufactured through the aforementioned procedure as a raw material. As disclosed in the examples described later, blending the swelling-inhibited starch makes it possible to obtain a food or beverage that exhibits suitable spreading and viscoelasticity and that furthermore has an excellent consistency with little sliminess.

There is no particular limitation as to the food or beverage in the present invention, provided that the swelling-inhibited starch can be blended therein. Processed foods are preferred, and soups/sauces, baked foods, yogurts and other fluid foods, smoothies and other beverages, cheeses, processed seafood, processed meat products and fried foods are particularly preferred.

The amount of the swelling-inhibited starch blended into the food or beverage in the present invention is not particularly limited. For example, a blending amount of 0.1-15 mass % is preferred when the swelling-inhibited starch is blended to a soup/sauce, a blending amount of 0.5-75 mass % is preferred when the swelling-inhibited starch is blended to a baked food, a blending amount of 0.5-15 mass % is preferred when the swelling-inhibited starch is blended to a yogurt or another fluid food, a blending amount of 0.1-12 mass % is preferred when the swelling-inhibited starch is blended to a smoothie or another beverage, a blending amount of 1-45 mass % is preferred when the swelling-inhibited starch is blended to a cheese, a blending amount of 1-30 mass % is preferred when the swelling-inhibited starch is blended to processed seafood, processed meat products and incorporating 2-100 mass % in a mix powder for forming a batter is preferred when the swelling-inhibited starch is blended to a fried food.

Example 1

The present invention is described in greater detail below through presentation of examples, but the technical scope of the present invention is not limited by the examples given below. In the present description, units such as "%" and "parts" are in terms of mass unless particularly described otherwise, and numeric value ranges are inclusive of endpoints thereof.

<Method for Measuring $M_0$>

The moisture content of a starch at normal temperature and normal humidity was measured using a rapid moisture meter (model MT-C made by Brabender) at 130° C. for 20 minutes.

<Method for Measuring $M_1$>

A starch that was adjusted to a prescribed moisture content through addition of water, or through drying using a dryer, was supplied to the rapid moisture meter, and the moisture content of the starch was measured at 130° C. for 20 minutes.

<Method for Measuring Breakdown Value>

The viscosity of a starch paste solution was measured as follows using a paste viscosity measurement device (Rapid Visco Analyzer (RVA) made by Perten, model RVA-4500). Accordingly, a sample starch measured to be 1.8 g in terms of solid content was introduced into an aluminum canister, and purified water was added to reach a total mass of 30 g (6 mass %), after which a paddle was positioned and the viscosity was measured under the conditions shown in Table 1.

Breakdown value=highest viscosity−lowest viscosity

<Method for Measuring Extent of Starch Damage>

The extent of starch damage was measured using a "Starch Damage Assay Kit" made by Megazyme in accordance with the protocols associated therewith.

<Preparation of Samples>

(Samples 1 to 6)

150 g of unprocessed tapioca ($M_0=13.0$) was adjusted through addition of water or through drying so that the moisture content ($M_1$) shown in table 2 was reached. Next, for samples 2 to 6, starches were prepared through heating treatment under the conditions in table 2 using an air-blasting dryer. The moisture content of the starch in sample 1 could not be maintained at the desired low value due to the effect of outside air in the air-blasting dryer; therefore, the starch was prepared through heating treatment under the conditions in table 2 using a reduced-pressure dryer. The pH of the unprocessed tapioca was 6.0.

The breakdown change rate and the extent of starch damage for the resultant samples were measured. The results are shown in table 2.

TABLE 2

| | $M_0$ | $M_1$ | $M_1 - M_0$ | Heating temp. (° C.) | Heating time (hours) | Breakdown value (mPa · s) | Breakdown change rate (%) | Extent of starch damage (%) |
|---|---|---|---|---|---|---|---|---|
| Sample 1 | 13 | 0.9 | −12.1 | 130 | 0.5 | 579 | 81.1 | — |
| Sample 2 | 13 | 4 | −9 | 130 | 0.5 | 498 | 69.7 | 0.5 |
| Sample 3 | 13 | 6 | −7 | 130 | 1.0 | 508 | 71.1 | 0.5 |
| Sample 4 | 13 | 13 | 0 | 130 | 1.0 | 515 | 72.1 | 0.3 |
| Sample 5 | 13 | 25 | 12 | 130 | 1.5 | 522 | 73.1 | 0.3 |
| Sample 6 | 13 | 30 | 17 | 130 | 1.5 | 515 | 72.1 | 0.5 |

*Breakdown value of unprocessed tapioca: 714 mPa · s.

As shown in table 2, in all of the samples in which tapioca for which the value of $M_1-M_0$ was within the range from −9 to 17 was heat-treated at 130° C. using an air-blasting dryer (samples 2 to 6), the breakdown change rate for a starch paste solution was 75% or less and the extent of starch damage was 5% or less, these being unproblematic values. However, in sample 1, in which tapioca for which the value of $M_1-M_0$ was −12.1 was used, swelling could not be adequately inhibited. This is thought to be because the moisture content during the reaction was too low. Accordingly, it was indicated that heat-treating a starch for which the moisture content was adjusted to a suitable range resulted in the swelling-inhibiting treatment being efficiently implemented on the starch.

(Samples 7 to 15)

Tapioca was heat-treated in the same manner as for samples 2 to 6, except that the heating temperature was set as in table 3, to prepare samples 7 to 15. The results are shown in table 3.

TABLE 3

| | $M_0$ | $M_1$ | $M_1 - M_0$ | Heating temp. (° C.) | Heating time (hours) | Breakdown value (mPa · s) | Breakdown change rate (%) | Extent of starch damage (%) |
|---|---|---|---|---|---|---|---|---|
| Sample 7 | 13 | 30 | 17 | 80 | 22.0 | 519 | 72.7 | 0.4 |
| Sample 8 | 13 | 30 | 17 | 90 | 16.0 | 513 | 71.8 | 0.4 |
| Sample 9 | 13 | 30 | 17 | 100 | 7.0 | 522 | 73.1 | 0.3 |
| Sample 10 | 13 | 30 | 17 | 130 | 1.5 | 515 | 72.1 | 0.5 |
| Sample 11 | 13 | 30 | 17 | 150 | 0.8 | 520 | 72.8 | 0.9 |
| Sample 12 | 13 | 30 | 17 | 160 | 0.8 | 531 | 74.4 | 1.6 |
| Sample 13 | 13 | 30 | 17 | 170 | 0.5 | 512 | 71.7 | 1.5 |
| Sample 14 | 13 | 30 | 17 | 200 | 0.2 | 521 | 73.0 | 3.0 |
| Sample 15 | 13 | 30 | 17 | 210 | 0.2 | — | — | — |

*Breakdown value of unprocessed tapioca: 714 mPa · s.

*Sample 15, which was subjected to a heating temperature of 210° C., could not be evaluated due to having been discolored and scorched.

As shown in table 3, in all of the samples in which the heating treatment was performed using a heating treatment temperature of 80-200° C. (samples 7 to 14), the breakdown change rate for a starch paste solution was 75% or less and the extent of starch damage was 5% or less, these being unproblematic values. However, in sample 15, in which the heating treatment was performed at 210° C., the heating temperature was too high and the starch was discolored and scorched, making the sample unsuitable as a food raw material.

(Samples 16 to 21)

Tapioca was heat-treated in the same manner as for samples 2 to 6, except that the value of $M_1$ and the heating temperature were set as in table 4, to prepare samples 16 to 21. The results are shown in table 4.

TABLE 4

|  | $M_0$ | $M_1$ | $M_1 - M_0$ | Heating temp. (° C.) | Heating time (hours) | Breakdown value (mPa · s) | Breakdown change rate (%) | Extent of starch damage (%) |
|---|---|---|---|---|---|---|---|---|
| Sample 16 | 13 | 6 | −7 | 160 | 0.3 | 516 | 72.3 | 0.5 |
| Sample 17 | 13 | 30 | 17 | 160 | 0.8 | 531 | 74.4 | 1.6 |
| Sample 18 | 13 | 40 | 27 | 160 | 1.0 | 541 | 75.8 | 5.5 |
| Sample 19 | 13 | 6 | −7 | 200 | 0.2 | 461 | 64.6 | 0.3 |
| Sample 20 | 13 | 30 | 17 | 200 | 0.2 | 521 | 73.0 | 3.0 |
| Sample 21 | 13 | 40 | 27 | 200 | 0.5 | 383 | 53.6 | 13.7 |

*Breakdown value of unprocessed tapioca: 714 mPa · s.

As shown in table 4, in all of the samples for which the value of $M_1 - M_0$ was within the range from −10 to 20 when the heating treatment temperature was 160° C. or 200° C. (samples 16, 17, 19, and 20), the breakdown change rate for a starch paste solution was 75% or less and the extent of starch damage was 5% or less, these being unproblematic values. However, in the samples for which the value of $M_1 - M_0$ was greater than 20 (samples 18 and 21), although swelling was adequately inhibited, there were cases where the apparent breakdown change rate increased due to an increase in peak viscosity caused by an increase in starch damage. In addition, the extent of starch damage was greater than 5%, and a spreading-related consistency or a sticky mouthfeel approximating that of a paste readily resulted when the starch was added to a food or beverage.

(Samples 22 to 26)

230 g of unprocessed tapioca was prepared so that the moisture content ($M_1$) shown in table 5 was reached. The starches were then heat-treated under the conditions in table 5 using a kneader (0.5-L-capacity batch kneader) to prepare samples 22 to 26.

TABLE 5

|  | $M_0$ | $M_1$ | $M_1 - M_0$ | Heating temp. (° C.) | Heating time (hours) | Breakdown value (mPa · s) | Breakdown change rate (%) | Extent of starch damage (%) |
|---|---|---|---|---|---|---|---|---|
| Sample 22 | 13 | 30 | 17 | 50 | 8.0 | 605 | 84.7 | — |
| Sample 23 | 13 | 30 | 17 | 60 | 4.0 | 429 | 60.1 | 1.7 |
| Sample 24 | 13 | 30 | 17 | 70 | 2.0 | 458 | 64.1 | 3.7 |
| Sample 25 | 13 | 30 | 17 | 80 | 1.0 | 399 | 55.9 | 4.3 |
| Sample 26 | 13 | 23 | 10 | 130 | 0.3 | 390 | 54.6 | 1.6 |

*Breakdown value of unprocessed tapioca: 714 mPa · s.

As shown in table 5, a swelling-inhibiting reaction advanced more readily when a kneader, which is closed heating equipment, was used than when an air-blasting dryer was used, and the desired starch was obtained even under heating conditions of 60° C. Under heating conditions of 50° C., swelling could not be adequately inhibited.

(Preparation of Samples 27 to 30)

A heating treatment was performed in the same manner as for samples 2 to 6, except that unprocessed potato starch or unprocessed corn starch was used as the raw material and the heating temperature was set as in table 6, to prepare samples 27 to 29. In addition, a heating treatment was performed in the same manner as for samples 22 to 26, except that unprocessed corn starch was used as the raw material and the heating temperature was set as in table 6, to prepare sample 30. The pH of the unprocessed potato starch and the unprocessed corn starch was 7.0 and 4.0, respectively.

starch due to differences in the crystalline structures of these starches. However, in the sample in which corn starch was heat-treated at 90° C. using a kneader, which is closed heating equipment (sample 30), the breakdown change rate for a starch paste solution was 75% or less, the extent of starch damage was 5% or less, and a desired starch was obtained. The increase in the breakdown change rate for samples 28 and 29, in which corn starch was used, originated from the pH of the starch. Accordingly, it is thought that because corn starch has a lower starch pH than tuber-based starches, a decrease in the molecular weight of the corn starch advanced during the heating treatment.

A swelling-inhibited starch having the desired performance was obtained also when the present invention was

TABLE 6

| | Raw-material starch | Reaction equipment | $M_0$ | $M_1$ | $M_1 - M_0$ | Heating temp. (° C.) | Heating time (hours) | Breakdown value (mPa · s) | Breakdown change rate (%) | Extent of starch damage (%) |
|---|---|---|---|---|---|---|---|---|---|---|
| Sample 27 | Potato starch | Air-blasting dryer | 17 | 23 | 6 | 130 | 2.0 | 3023 | 69.9 | 0.8 |
| Sample 28 | Corn starch | | 12 | 29 | 17 | 130 | 1.5 | 200 | 126.6 | — |
| Sample 29 | | | 12 | 29 | 17 | 170 | 0.5 | 197 | 124.7 | — |
| Sample 30 | | Kneader | 12 | 28 | 16 | 90 | 0.2 | 97 | 61.4 | 1.3 |

*Breakdown value of unprocessed potato starch: 4322 mPa · s.
*Breakdown value of unprocessed corn starch: 158 mPa · s.

As shown in table 6, in sample 27, in which potato starch for which the value of $M_1-M_0$ was within the range from −10 to 20 was heat-treated at 130° C. using an air-blasting dryer, the breakdown change rate for a starch paste solution was 75% or less and the extent of starch damage was 5% or less, these being unproblematic values. However, in the samples in which corn starch for which the value of $M_1-M_0$ was within the range from −10 to 20 was heat-treated at 130° C. or 170° C. using an air-blasting dryer (samples 28 and 29), swelling could not be adequately suppressed. This is thought to be because inhibition of swelling does not advance as readily for corn starch, which is a grain-based starch, as for tuber-based starches such as tapioca and potato implemented using a stirring dryer, which is closed heating equipment, instead of a kneader, which similarly is closed heating equipment (Data are omitted).

(Preparation of Samples 31 to 35)

A heating treatment was performed using closed heating equipment in the same manner as for samples 22 to 26, except that unprocessed corn starch was used as the raw material and the heating conditions were set as in table 7, to prepare samples 31 to 35.

TABLE 7

| | Raw-material starch | Reaction equipment | $M_0$ | $M_1$ | $M_1 - M_0$ | Heating temp. (° C.) | Heating time (hours) | Breakdown value (mPa · s) | Breakdown change rate (%) |
|---|---|---|---|---|---|---|---|---|---|
| Sample 30 | Corn starch | Kneader | 12 | 28 | 16 | 90 | 0.2 | 97 | 61.4 |
| Sample 31 | Corn starch | Kneader | 12 | 32 | 20 | 90 | 0.1 | 0 | 0 |
| Sample 32 | Corn starch | Kneader | 12 | 23 | 11 | 90 | 1.5 | 114 | 72.2 |
| Sample 33 | Corn starch | Kneader | 12 | 28 | 16 | 160 | 0.2 | 0 | 0 |
| Sample 34 | Corn starch | Kneader | 12 | 28 | 16 | 70 | 1.0 | 81 | 51.3 |
| Sample 35 | Corn starch | Kneader | 12 | 28 | 16 | 90 | 1.0 | 35 | 22.2 |

*Data for sample 30 was drawn from table 6.
*Because the starch does not break down when inhibition of swelling is stronger, a breakdown value of "0" means that a particularly strong swelling-inhibiting treatment was implemented.

As shown in table 7, the relationship between heating conditions and inhibition of swelling in the starches shown using tapioca in the examples described above (samples 1 to 26) is the same for corn starch, and swelling-inhibited starches for which the breakdown change rate was 75% or less were obtained. The extent of starch damage for sample 30 and sample 34, in which the extent to which swelling was inhibited was similar, was 1.3% and 2.0%, respectively, and it was confirmed that there was no great difference in consistency between these samples (for convenience in terms of number of work steps, the extent of starch damage was measured for a representative subset of samples).

(Preparation of Samples 36 to 41)

A heating treatment was performed using closed heating equipment in the same manner as for samples 22 to 26, except that unprocessed potato starch was used as the raw material and the heating conditions were set as in table 8, to prepare samples 36 to 41.

TABLE 8

| | Raw-material starch | Reaction equipment | $M_0$ | $M_1$ | $M_1 - M_0$ | Heating temp. (° C.) | Heating time (hours) | Breakdown value (mPa · s) | Breakdown change rate (%) |
|---|---|---|---|---|---|---|---|---|---|
| Sample 27 | Potato starch | Air-blasting dryer | 17 | 23 | 6 | 130 | 2.00 | 3023 | 69.9 |
| Sample 36 | Potato starch | Kneader | 17 | 23 | 6 | 130 | 0.2 | 1089 | 25.2 |
| Sample 37 | Potato starch | Kneader | 17 | 25 | 8 | 130 | 0.1 | 0 | 0 |
| Sample 38 | Potato starch | Kneader | 17 | 17 | 0 | 130 | 0.75 | 3043 | 70.4 |
| Sample 39 | Potato starch | Kneader | 17 | 23 | 6 | 160 | 0.1 | 540 | 12.5 |
| Sample 40 | Potato starch | Kneader | 17 | 23 | 6 | 90 | 1.0 | 3120 | 72.2 |
| Sample 41 | Potato starch | Kneader | 17 | 23 | 6 | 130 | 1.0 | 0 | 0 |

*Data for sample 27 was drawn from table 6.
*Because the starch does not break down when inhibition of swelling is stronger, a breakdown value of "0" means that a particularly strong swelling-inhibiting treatment was implemented.

As shown in table 8, the relationship between heating conditions and inhibition of swelling in the starches shown using tapioca in the examples described above (samples 1 to 26) is the same for potato starch, and swelling-inhibited starches for which the breakdown change rate was 75% or less were obtained. The extent of starch damage for sample 27 and sample 38, in which the extent to which swelling was inhibited was similar, was 0.8% and 1.8%, respectively, and it was confirmed that there was no great difference in consistency between these samples (for convenience in terms of number of work steps, the extent of starch damage was measured for a representative subset of samples).

Experiment 1: Fruit Sauce

Fruit sauces were created in the following manner using samples 1, 2, 17, 18, 22, and 23 in the blending ratios shown in table 9. Specifically: a starch sample (samples 1, 2, 17, 18, 22, and 23), a sugar solution, raspberry puree, and granulated sugar were weighed out in an RVA dedicated aluminum canister; purified water was added thereto; the contents of the RVA dedicated aluminum canister were mixed and stirred; and the mixture was then adjusted so as to reach a pH of 3.0 using a 50% citric acid solution to prepare a solution having a total mass of 30 g. A paddle was positioned, and the resultant solution was supplied to a paste viscosity measurement device, whereby a heating treatment was performed. The solution was heated at a rate of 3° C. per minute from 55° C. to 85° C. at a rotation speed of 160 rpm, after which the temperature was maintained for seven minutes. The solution was then cooled to room temperature using running water.

TABLE 9

| Raw material | Blend (%) |
|---|---|
| Starch | 4.5 |
| Sugar solution (*1) | 15.0 |
| Granulated sugar | 15.0 |
| Raspberry puree | 30.0 |

TABLE 9-continued

| Raw material | Blend (%) |
|---|---|
| Purified water | 35.0 |
| 50% citric acid solution | 0.5 |
| Total | 100.0 |

(*1): "MC-55" made by Nihon Shokuhin Kako.

A sensory evaluation by five panelists was carried out on the resultant fruit sauce after cooling. In the sensory evaluation, spreading of the sauce (a lower value equates to a better evaluation), as well as sliminess and melt-in-the-mouth sensation (less sliminess and a greater melt-in-the-mouth sensation equates to a better evaluation), were evaluated using a point system ranging from −5 to +5, with unprocessed tapioca being used as a reference (0 points), and the point averages were calculated. The results are shown in table 10.

TABLE 10

| | Sample no. | Spreading | Sliminess and melt-in-the-mouth sensation |
|---|---|---|---|
| Example 1 | Sample 2 | 3.2 | 3.0 |
| Example 2 | Sample 17 | 3.8 | 3.4 |

TABLE 10-continued

|  | Sample no. | Spreading | Sliminess and melt-in-the-mouth sensation |
|---|---|---|---|
| Example 3 | Sample 23 | 3.0 | 3.2 |
| Comparative example 1 | Sample 1 | 0.2 | −1.0 |
| Comparative example 2 | Sample 18 | 2.6 | −0.8 |
| Comparative example 3 | Sample 22 | −0.2 | −0.2 |

As shown in table 10, examples 1 to 3 exhibited quality suitable for sauces in that the sauce spread only a short distance, sliminess was improved, and an excellent melt-in-the-mouth sensation was achieved. In comparative examples 1 and 2, although the sauce spread a shorter distance than with unprocessed tapioca, this effect was not as strongly obtained as in the examples. Comparative example 3 exhibited quality not suitable for a sauce in that the sauce spread a very long distance. Additionally, comparative example 1 exhibited a highly viscoelastic mouthfeel reminiscent of slime, and comparative example 2 was very similar to a paste and yielded a poor melt-in-the-mouth sensation.

Several embodiments of the present invention were described above, but these embodiments are merely presented as examples and are not intended to limit the scope of the invention. These novel embodiments can be carried out in various other forms, and a variety of omissions, substitutions, and modifications can be made within a scope that does not depart from the gist of the invention. These embodiments, and modifications thereof, are included within the scope and gist of the invention and moreover are included within a scope equivalent to that of the invention set forth in the claims.

The invention claimed is:

1. A method for manufacturing a swelling-inhibited starch, the method comprising:
    a step for performing a heating treatment at 55-205° C. on a starch for which a value of $M_1-M_0$ is within a range from −10% to 20% and setting a breakdown value of a starch paste solution to no greater than 75% of the value before the heating treatment, thereby obtaining a swelling-inhibited starch consisting of the starch and water,
    wherein the heating treatment is performed using closed heating equipment;
    wherein the $M_1$ is a moisture content (%) of the starch before the heating treatment, and the $M_0$ is an equilibrium moisture content (%) of the starch at 23° C. and 50% RH.

2. The method for manufacturing a swelling-inhibited starch according to claim 1, wherein the method further comprises a step for adjusting the value of $M_1-M_0$ to within the range from −10% to 20%.

3. The method for manufacturing a swelling-inhibited starch according to claim 1, wherein the starch subjected to the heating treatment is an unprocessed starch.

4. The method for manufacturing a swelling-inhibited starch according to claim 1, wherein the starch subjected to the heating treatment is an unprocessed tuber-based starch.

5. The method for manufacturing a swelling-inhibited starch according to claim 1, further comprising, prior to the heating treatment:
    a step for adjusting a moisture content of the starch by either adding water to the starch or drying the starch such that the value of $M_1-M_0$ of the starch falls within the range from −10% to 20%.

6. A method for manufacturing a food or beverage, the method comprising:
    a step for performing a heating treatment at 55-205° C. on a starch for which a value of $M_1-M_0$ is within a range from −10% to 20% and setting a breakdown value of a starch paste solution to no greater than 75% of the value before the heating treatment, thereby obtaining a swelling-inhibited starch consisting of the starch and water, and
    a step for blending the obtained swelling-inhibited starch with one or more additional materials to obtain the food or beverage;
    wherein the heating treatment is performed using closed heating equipment; and
    wherein the $M1$ is a moisture content (%) of the starch before the heating treatment, and the $Mo$ is an equilibrium moisture content (%) of the starch at 23° C. and 50% RH.

7. The method for manufacturing a food or beverage according to claim 6, wherein the food or beverage is at least one selected from soups/sauces, processed seafood, processed meat products, or fried foods.

* * * * *